United States Patent [19]
Morrissey et al.

[11] 3,978,974
[45] Sept. 7, 1976

[54] CONVEYING GLASS SHEETS OF DIFFERENT CURVATURES

[75] Inventors: Jack D. Morrissey, Tyrone; Robert G. Frank, Murrysville, both of Pa.

[73] Assignee: PPG Industries, Inc., Pittsburgh, Pa.

[22] Filed: Feb. 4, 1975

[21] Appl. No.: 546,854

[52] U.S. Cl. .............................. 198/782; 193/37; 65/245; 29/110
[51] Int. Cl.² ........................................ B65G 13/02
[58] Field of Search .................. 198/127 R, 192 R; 193/37; 65/245, 253, 374 R, 374 M, 374 RM; 29/110, 116 R, 125; 403/3, 359; 192/67 R

[56] References Cited
UNITED STATES PATENTS

| 1,074,188 | 9/1913 | McGlynn | 403/3 |
| 2,592,819 | 4/1952 | Moessinger | 192/67 R |
| 3,729,088 | 4/1973 | Vomstein et al. | 198/127 R |
| 3,763,979 | 10/1973 | Goodman et al. | 192/67 R |
| 3,807,546 | 4/1974 | Canonaco | 198/127 R |

*Primary Examiner*—Evon C. Blunk
*Assistant Examiner*—Joseph E. Valenza
*Attorney, Agent, or Firm*—Edward I. Mates

[57] ABSTRACT

Apparatus for conveying hot glass sheets in a non-vertical orientation through a glass cooling station on spaced rolls capable of rapid and exact adjustment from roll to roll to support and convey either flat glass sheets or sheets shaped to different shapes.

10 Claims, 6 Drawing Figures

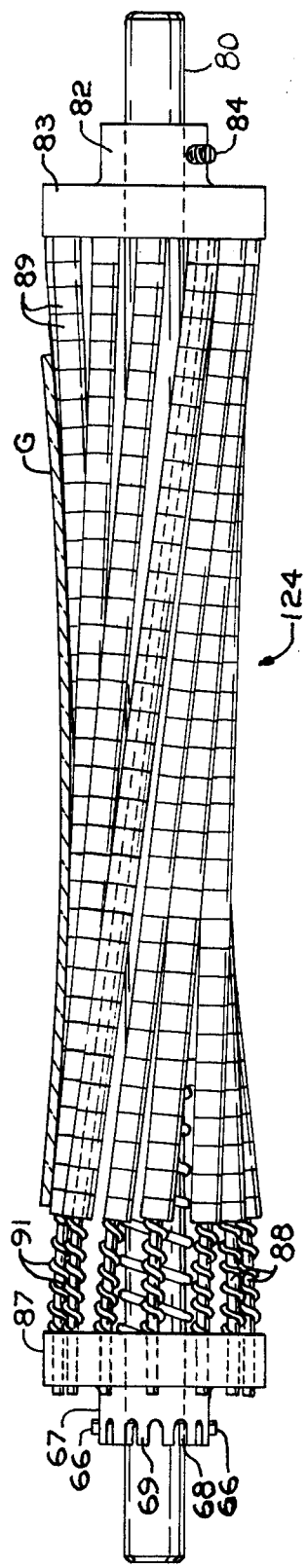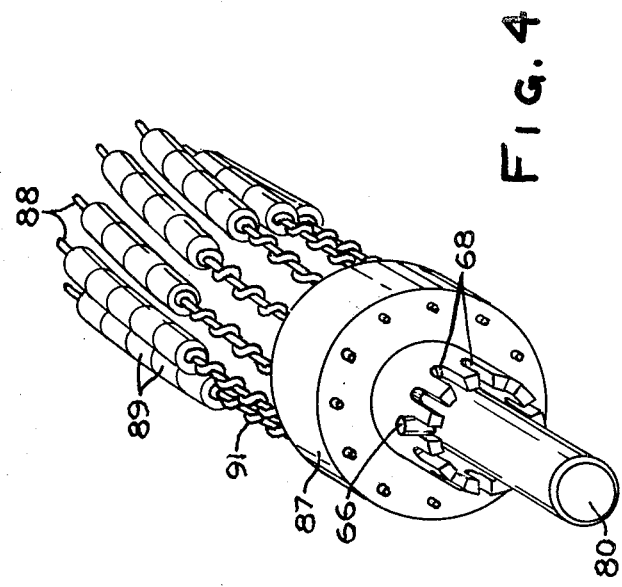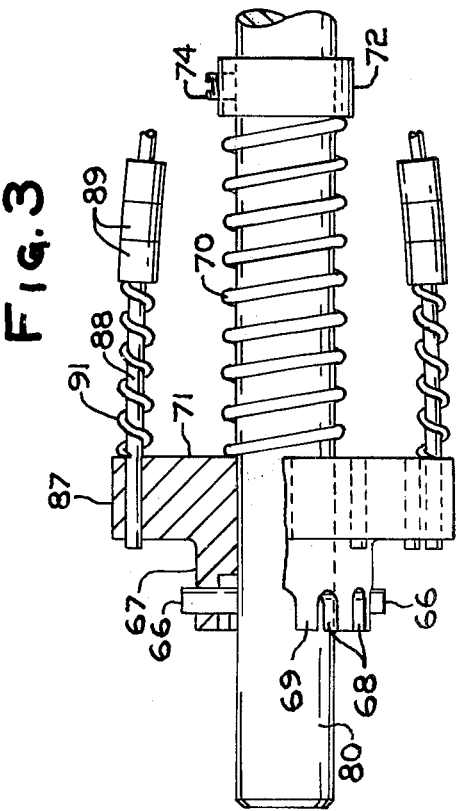

CONVEYING GLASS SHEETS OF DIFFERENT CURVATURES

BACKGROUND OF THE INVENTION

1. Field of the Invention

The present invention relates to apparatus for conveying hot glass sheets in a non-vertical orientation and particularly relates to apparatus for conveying hot, shaped glass sheets through a glass sheet chilling station, although the apparatus is also adapted to convey hot, flat glass sheets through the cooling station.

The rolls of the present invention are particularly adapted for use in a roller conveyor. When glass sheets are bent and then cooled for tempering or heat strengthening, the glass is first heated to its deformation temperature so that it can be shaped into the desired curvature. However, when glass sheets are sufficiently hot to be shaped or heat strengthened, the glass surfaces are very susceptible to becoming marked and/or distorted, especially when the hot glass is conveyed along a series of rotating conveyor rolls having sufficient rigidity at elevated temperatures needed for glass tempering to support and propel the glass sheets through regions of different temperatures.

It has been suggested to selectively chill the surface only of the hot glass sheets to reduce surface markings caused by direct contact of the rotating roll against the heat-softened glass sheet surfaces. However, any premature chilling of the glass surface reduces the overall glass temperature and reduces the maximum compression stress that can be obtained by subsequent chilling. Furthermore, any chilling that is uneven from surface to surface may cause warpage of the sheet and it is difficult to obtain a cooling pattern symmetrical about the center of the glass thickness that avoids warpage.

It has also been proposed to shape the glass like a dome and support the glass along its longitudinal side edges only from the shaping station to the chilling station in order to reduce glass to roll contact during the time the glass sheet is hot enough to be readily distorted or marked. If the shaped glass is deposited directly on the conveyor rolls, the utility of such a suggestion is limited to certain shapes of glass having straight side edges only.

Carriages with movable glass supporting fingers have been used to transport glass sheets from a shaping station for deposition onto rotating conveyor rolls at a chilling station. Such finger supports may sometimes provide too small an area for supporting the entire glass mass and may thus cause local variations from desired shapes or dimpled regions that result in optical distortion when the glass is too heavy to be supported on spaced fingers defining narrow areas of support.

Flat glass sheets have been supported on solid conveyor rolls provided with covers of a material that does not harm glass on rolling contact therewith. However, prior to the present invention, conveyor rolls provided with capability of adjustment to curved shapes to conform to the shape of conveyed glass sheets were not capable of rapid adjustment when it was required to change the apparatus for treating glass sheets to adapt the apparatus for a different pattern having a different shape from one previously produced. Furthermore, no glass conveying apparatus provided with fulid permeable rolls was available prior to the present invention that altered the shape of each conveyor roll to approximately the exact supporting shape of each other roll in the portion of the conveyor system for moving glass sheets through a glass chilling station.

2. The Prior Art

U.S. Pat. No. 3,807,546 to Canonaco and U.S. Pat. No. 3,807,982 to Claassen and Canonaco disclose fluid permeable conveyor rolls especially suitable for conveying either flat or shaped glass sheets while hot through a glass sheet chilling station. The rolls of these patents have a rigid center shaft, a pair of hubs, additional peripheral shafts interconnecting the peripheral portions of the hubs, and means for adjusting the angular position of at least one of the hubs with respect to the other hub so that the peripheral shafts extend at an angle to the rigid center shaft from hub to hub, thus defining a series of lines that intersect a curvilinear plane conforming to the shape of conveyed bent glass sheets and provide lines of support that move obliquely of the path of glass movement. Each peripheral shaft is preferably of a material rigid enough to support the glass, yet flexible enough to bend in response to relative hub rotation, such as metal wire. To protect glass sheets from direct contact against the metal wire, a material that does not mar hot glass is interposed between the peripheral shafts and the supported glass. The space between adjacent conveyor rolls is left open to allow free flow of tempering medium toward the supported bottom glass sheet surface.

According to the Claassen and Canonaco patent, a sleeve of a permeable material is provided around the discontinuous surface of the peripheral shafts or wires to protect against direct contact between the peripheral shafts of each flexible roll and the glass. The permeability of the sleeve permits additional flow of tempering medium between the rigid center shaft and the flexible peripheral shafts and also between adjacent of said peripheral shafts en route to the supported glass surface.

The Canonaco patent provides beads of a material harmless to glass along the length of each peripheral shaft to prevent the glass sheets from making direct contact with the peripheral shafts. The beads are so small that space is provided between adjacent peripheral shafts and between the rigid center shaft and the peripheral shafts to permit flow of tempering medium through said conveyor roll toward the bottom surface of the conveyed glass sheets.

SUMMARY OF THE INVENTION

The present invention relates to a further improvement in conveyor rolls typical of the aforesaid Canonaco and Claassen and Canonaco patents, particularly to an improvement in the conveyor roll of the Canonaco patent which permits each roll of a conveyor to provide a peripheral supporting surface having the same shape as every other roll along the conveyor extending through the chilling station and means for rapidly changing the contour of the peripheral supporting surfaces from one exact shape to another.

In order to accomplish the purposes of the present invention, one of the hubs mounted on the center shaft is specially constructed to cooperate with special hub locking means that assures that the specially constructed hub occupies one of several predetermined angular positions relative to the rigid center shaft and the first hub rigidly fixed to said center shaft. The special hub and the special hub locking means are readily assembled in locked relation so that the special hub occupies any of the predetermined angular positions that can be readily duplicated in every other roll in the conveyor. Furthermore, the special hub and the special hub locking means may be readily separated from any locked position whenever it is necessary to lock the special hub in another predetermined angular position relative to the center shaft and said first hub.

Either the special hub or the hub locking means is axially displacable relative to the central shaft and the special hub is rotatably mounted on the shaft and its peripheral portion supports the end portions of the peripheral shafts opposite those supported by the peripheral portion of the rigidly fixed hub. In preferred embodiments of this invention, tongue and groove means is disposed around the perimeter portion of said special hub and the hub locking means has means capable of interfitting with said tongue and groove means at any one of several predetermined angular orientations. The preferred embodiments comprise means to urge the special hub and hub locking means into fixed relation to one another in any selected angular orientation wherein the hub and hub locking means interfit with one another to support the peripheral portion of the rotatably mounted special hub at a predetermined angular orientation relative to the rigidly fixed hub so that each of said flexible peripheral shafts extending between the rigidly fixed hub and the rotatably mounted hub becomes oriented in a selected angular relation to the centrally disposed shaft. The peripheral shafts provide spaced lines of support along a curved surface for supporting a convexly curved or flat bottom surface of a shaped glass sheet at a substantially identical angular relation to the corresponding lines of support provided by other conveyor rolls used to transport the glass sheets through the cooling station of glass sheet tempering apparatus.

The cooperating tongue and groove means are preferably arranged to provide a series of small equiangular adjustments between the hub locking means and the special hub. The substitution of the special hub and hub locking means for one of the two hubs of the prior art has enabled a faster and more exact adjustment of each conveyor roll than was possible prior to this invention.

BRIEF DESCRIPTION OF THE DRAWINGS

In the drawings that form part of a description of preferred embodiments of the present invention and wherein like reference number refer to like structural elements.

FIG. 2 is a fragmentary transverse view of a conveyor roll according to one embodiment of the present invention adjusted to convey shaped glass;

FIG. 3 is an enlarged sectional view of an end portion of the conveyor roll of FIG. 2 showing how the special hub cooperates with hub locking means to orient the special hub at any of a series of predetermined angular orientations according to the teachings of the present invention, with certain parts omitted to permit clearer view of the elements of said embodiment;

FIG. 4 is an end perspective view of the portion of the roll shown in FIG. 3;

DESCRIPTION OF THE PREFERRED EMBODIMENTS

Figure 1:
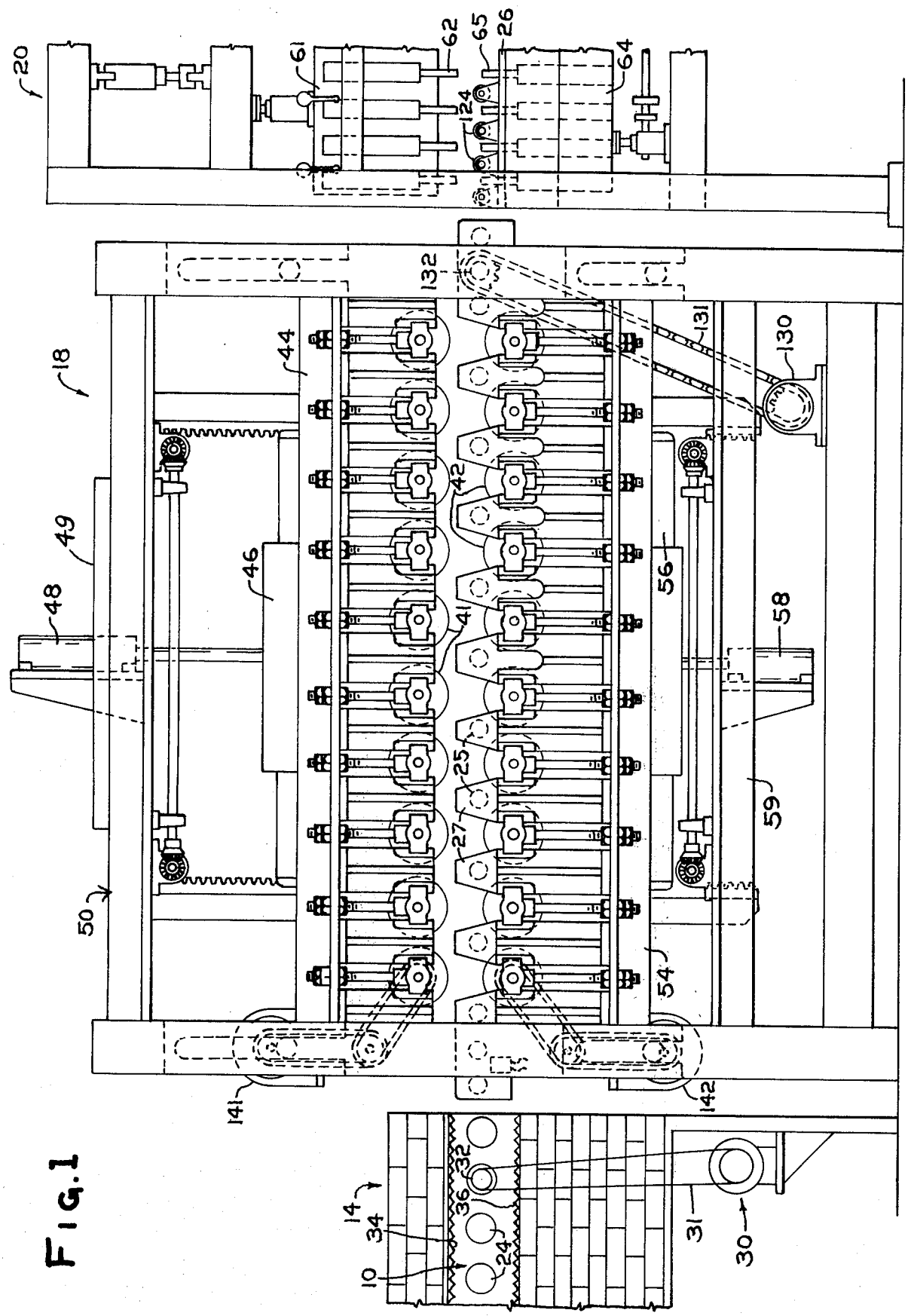
FIG. 1 is a longitudinal assembly view of a glass sheet bending and tempering apparatus provided with conveyor rolls according to the present invention at the glass sheet cooling station.

A preferred embodiment of apparatus suitable for using the present invention comprises a horizontal conveyor 10 extending through a loading station (not shown), a tunnel type furnace 14, a bending station 18, a chilling station 20, and one or more cooling stations as needed (not shown) and an unloading station (not shown) beyond the chilling station. The horizontal conveyor 10 comprises a series of transversely extending, longitudinal spaced rolls 24, 25 and 124. Rolls 24 and 124 are supported at their opposite ends on bearing housings carried by longitudinally extending supports 26 (mostly broken away) mounted on vertical pillars (not shown), while conveyor rolls 25 are mounted on spaced bearing brackets 27 at the bending station 18.

Each different conveyor portion from the loading station through the chilling station 20 is run continuously at established conveyor speeds from drive motors 30 or 130 connected through driving chains 31 or 131 to drive sprockets 32 or 132 and chain drives (not shown) to sprockets fixed to one of the conveyor rolls 24 or 25 or 124, respectively, of each conveyor portion, and interconnected by one or more drive chains to other drive sprockets fixed to each conveyor roll in the usual manner. The rolls 24, 25 and 124 are disposed either horizontally or at a slight oblique angle transverse to the path of movement to define a support plane along which a series of glass sheets is conveyed in a predetermined conveyor path extending through the loading station, the furnace 14, the bending station 18, the chilling station 20, the cooling stations (if included) and the unloading station.

Furnace 14 has the usual heating elements 34 and 36 disposed above and below the path taken by glass sheets as the conveyor rolls 24 are rotated in unison to engage and propel the glass sheets forward by friction in the usual manner. Thus, the glass sheets are heated to a temperature of from 1,200° to 1,300°F. (650° to 705°C.) while conveyed through the furnace.

Intermediate vertical planes occupied by each of the adjacent conveyor rolls 25 of the portion of the conveyor path extending through the bending station 18 is a pair of sets of shaped rolls 41 and 42 of complementary contour. Each upper shaped roll 41 is aligned with a corresponding lower shaped roll 42. The upper rolls are rotatably supported from their ends by vertically adjustable trunnions in an upper open frame structure 44 depending from an upper platform 46 which is attached to the lower end of a rod of an upper piston 48 carried on the upper portion 49 of a frame 50. Similarly, the lower rolls 42 are rotatably supported on vertically adjustable trunnions in a lower open frame 54 connected to and supported by a lower platform 56. The lower platform is attached to the upper end of a rod of a lower piston 58. A lower portion 59 of frame 50 carries the lower piston 58.

Means 141 and 142 are provided for rotating rolls 41 and 42 at independently adjustable speeds so that rubbing between a surface of the glass sheet and the shaped rolls is minimized when a glass sheet moves over the conveyor rolls 25 at the bending station 18. When the glass sheet is aligned between the shaped rolls 41 and 42, the lower set of shaped rolls 42 moves upward to lift the heat-softened glass off the conveyor rolls 25 and into pressurized contact against the upper set of shaped rolls 41 for a brief interval sufficient to impose the curvature of the rolls onto the glass sheet before the lower shaped rolls 42 retract to redeposit the shaped glass sheet on the conveyor rolls 25. The details of the roll pressing apparatus do not form part of the present invention but is the subject matter of U.S. Pat. No. 3,701,644 of Robert G. Frank, the disclosure of which is incorporated herein by reference.

The chilling station 20 comprises an upper plenum chamber 61 having downwardly extending nozzles 62 whose exit openings are disposed above special conveyor rolls 124 that extend horizontally in a transverse direction in longitudinally spaced relation throughout the chilling station 20 and a lower plenum chamber 64 having upwardly facing nozzles 65 extending upward toward the spaces between the conveyor rolls 124 of the chilling station 20. Means is provided for delivering air under pressure through delivery passages (not shown) to the respective plenum chambers 61 and 64 so that cool air blasts may be imparted to the upper and lower surfaces of glass sheets that are conveyed through the chilling station 20. Additional drive motors, drive chains and sprockets similar to 30, 31 and 32 may be provided to impart rotation to selected sections of the conveyor rolls 24, 25 and/or 124 through additional chain drives and clutches (not shown) at different speeeds if desired in a manner well known in the conveyor art.

The gist of the present invention is in providing special conveyor rolls 124 at the chilling station 20. The special conveyor rolls are capable of readily adjusting the shape of their peripheral portions to provide glass supporting elements that extend either parallel to a central shaft that drives the rolls for conveying flat glass sheets or are angled in fixed angular increments relative to said central shaft to enable the rolls to support and convey curved glass sheets. The glass supporting elements are peripherally arranged and made of flexible metal shafts that provide structural rigidity to support the conveyed glass sheets, but that would tend to damage the surface of heat-softened glass sheets. Hence, each metal shaft is provided with glass engaging means of a material that does not harm glass such as ceramic, wood, graphite, and the like, that protects the moving glass sheets from making direct contact with the peripherally arranged glass supporting elements. The space between adjacent conveyor rolls 124 is open to allow free air movement so that hot glass sheets conveyed by the rolls between upper plenum 61 and lower plenum 64 can be chilled rapidly and thus tempered. Also, the means covering each individual peripheral rod is flexible to conform to any twist that may be imparted to the rod on which it is mounted for reasons explained later.

Specifically, according to the present invention, the conveyor rolls to be used in the chilling station 20 are capable of rapid and exact adjustment between a peripheral surface capable to support and convey either flat or curved glass sheets while providing a minimum interference with the free flow of tempering medium such as air blasts which are conventionally used in a chilling station to rapidly chill the glass sheet surface so as to impart a temper to the glass.

Each of the special rolls 124 according to the present invention is provided with a central driving shaft 80 having a locking collar 82 provided with an enlarged inner end portion forming a first hub 83 for receiving the right hand end of a dozen flexible shafts 88 of flexible steel approximately 0.10 inch (2.54 millimeters) in diameter. A set screw 84 fixes the locking collar 82 together with the enlarged hub 83 to provide means to fix said hub in a given fixed position on said center shaft 80 both axially and angularly with respect to the central shaft 80.

A special enlarged peripherally apertured hub 87 has the left end of each flexible shaft 88 extending through one of its apertures. A number of beads 89 of smooth material relatively harmless to glass, such as an alumina-silica refractory, wood, graphite or the like, are rotatably supported in axial alignment along the length of each of the flexible steel rods 88 between the hub 87 and the extreme left bead 89. The beads 89 are nested to one another along the length of the shafts 88 and springs 91 sufficiently strong to insure that the beads 89 abut one another so as to provide a continuous or substantially continuous surface along the length of each of the shafts 88 along which the beads are mounted.

In FIG. 2, the shafts 88 are connected between each of the peripheral openings in the first enlarged hub 83 at the inner end portion of the locking collar 82 and the corresponding openings of the special enlarged apertured hub 87 so that each flexible shaft 88 extends parallel to provide means to fix said special hub 87 in a given angular relation to said center shaft 80 so that the periphery of the beads 89 provide rounded surfaces for supporting a moving glass sheet. Furthermore, the beads are of such a diameter that space is provided between adjacent lines of beads mounted on adjacent flexible peripheral shafts 88. Therefore, when air is blasted against the opposite surfaces of glass sheets conveyed through the cooling station 20 through nozzle openings 62 and 65 between adjacent rolls 124, the space within each roll 124 provides a good path for the escape of air from the lower glass surface that has been impinged with air.

FIGS. 3 and 4 show the detailed construction of one embodiment of the special hub 87 according to the present invention. In this embodiment, a hub locking means comprises a hub locking member 66 in the form of a drive pin fixed to extend diametrically beyond the surface of the center shaft 80. The second or special hub 87 is provided with a hub extension 67 extending away from hub 83 and smaller in diameter than the second hub 87. The hub extension 67 is provided with tongue and groove means comprising a series of peripherally arranged grooves 68 separated by tongues 69 at equal angular orientations to each adjacent groove. A spring 70 is mounted around the center shaft 80 with its outer end bearing against the inner surface 71 of the special hub 87. A collar 72 fixed to shaft 80 by a set screw 74 bears against the inner end of the spring 70. Normally spring 70 urges hub 87 against the hub locking member or drive pin 66 to lock the angular orientation of the hub 87 about about shaft 80.

When it becomes necessary to change the shape of the conveyor roll 124, hub 87 is pushed axially inward of shaft 80 until the pin 66 is disengaged from groove 68. Then, hub 87 is rotated until a selected groove is aligned with pin 66 and the hub is released to enable spring 70 to urge hub 87 toward the pin 66 until the newly selected groove 68 fits against the pin 66 and the pin 66 cooperates with spring 70 as hub locking means to maintain hub 87 in the newly desired orientation.

Figure 5:
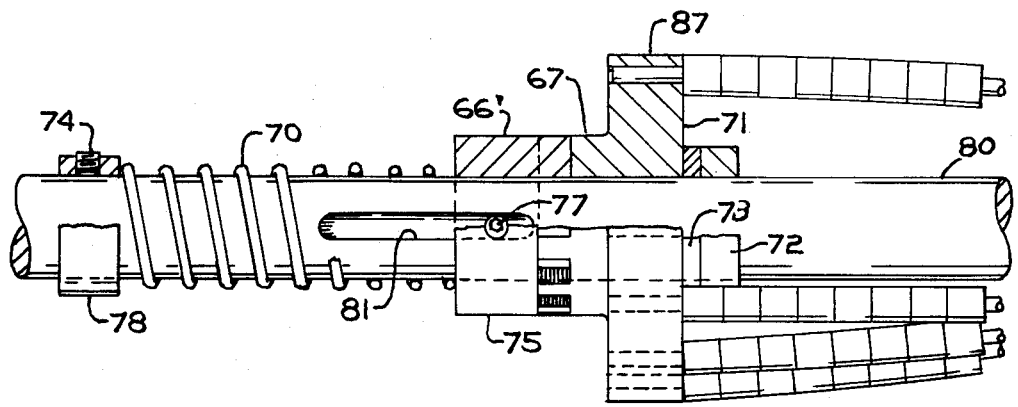
FIG. 5 is a sectional view of an end portion of an alternate embodiment of the conveyor roll.
Figure 6:
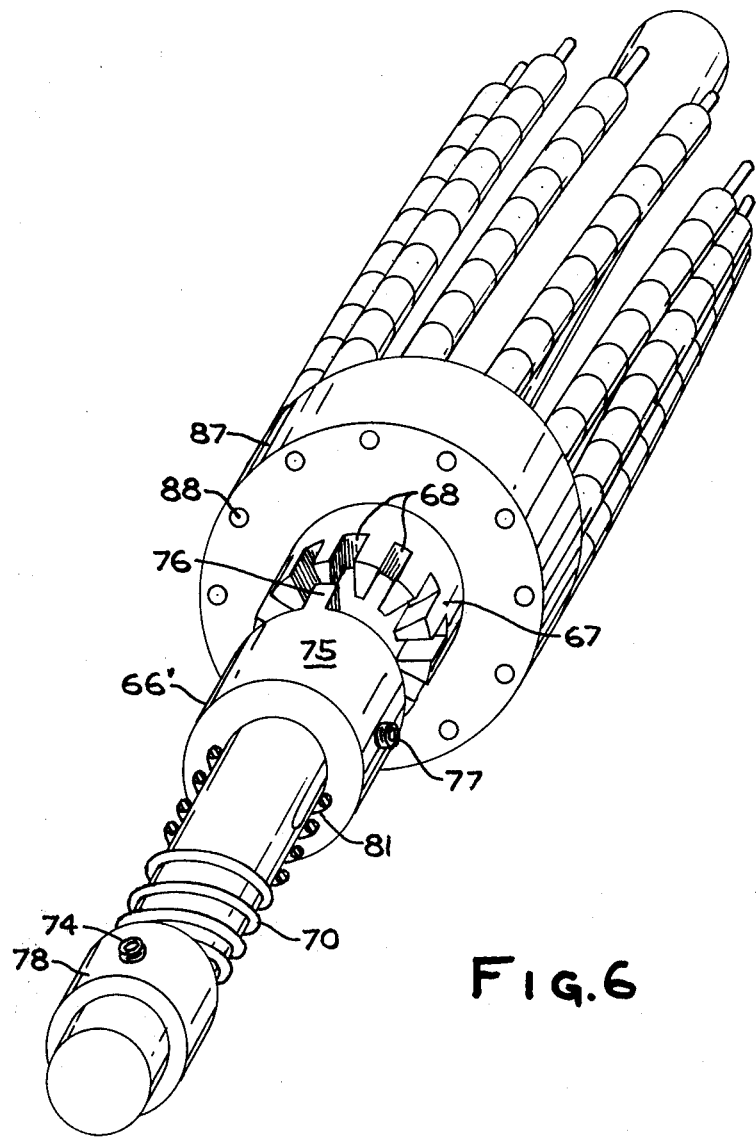
FIG. 6 is an end perspective view of the portion of the roll shown in FIG. 5.

FIGS. 5 and 6 show the detailed construction of an alternate embodiment of this invention. In this embodiment, the hub 87 is like in the first embodiment but its surface 71 is in direct bearing contact with a collar 72 fixed to center shaft 80 by a set screw 74 in bearing relation against the inner surface 71 of the special hub 87, with a washer 73 therebetween, if desired. The hub locking means 66' of this embodiment comprises a toothed collar 75 whose teeth 76 are diametrically opposed and extend axially inward of the center shaft 80 to engage a selected pair of diametrically opposed grooves 68 of the tongue and groove means of the hub 87. A key 77 projects radially inward of collar 75. An outer collar 78, similar to the inner collars 72 previously described, is mounted on shaft 80 and fixed thereto through a set screw 74 to the outside of hub locking means 66' with a spring 70 disposed around the center shaft 80 between outer collar 78 and hub locking means 66'. Shaft 80 is provided with an axially extending slot 81 that receives the key 77 to maintain the hub locking means 66' in permanent, unchanging orientation relative to shaft 80 as the collar 75 moves axially therealong between a position where teeth 76 engage a selected pair of grooves 68 and a retracted position where the teeth 76 are separated from the grooves 68.

The outer surface of the collar 75 is preferably knurled to permit ease of handling in the adjustment of the axial position of the collar 75 (which cooperates with spring 70 to serve as a hub locking means in this embodiment) relative to the hub 87. The embodiment of FIGS. 5 and 6 is very easy to adjust, because the collar 75 is easy to retract outward from the hub 87 whenever it is desired to disengage the hub locking means 66' from the hub 87. The latter easily rotates to a new discrete orientation position at any one of the possible predetermined angles to its previous orientation position relative to shaft 80 and hub 83.

In a commercial embodiment of this invention, hub 87 was provided with 12 grooves each 30° out of phase with each adjacent groove. This difference in angular orientation was suitable for rolls having 19 inches (48.26 millimeters) axial spacing between hubs. It is understood that any equiangular arrangement of grooves around the periphery of the special hub 87 suitable for the different curvatures of glass sheets to be processed can be substituted.

While it has not been found necessary to do so, it is understood that indicia may be provided to facilitate proper relative orientation of the hubs 83 and 87 relative to the shaft 80. One axially extending mark may be provided in alignment with set screw 84 and indicia marks or numbers to identify each groove in the special hub 87 of each conveyor roll may be provided to facilitate exact orientation of the proper grooves 68 with either the pin 66 or the teeth 76 of the respective embodiments so that each conveyor roll is adjusted exactly as each other conveyor roll.

The form of the invention shown and described in this disclosure represents illustrative preferred embodiments thereof. It is understood that various changes may be made without departing from the gist of the invention as defined in the claimed subject matter which follows.

We claim:

1. A conveyor roll for use in transporting glass sheets between spaced, opposed plenum chambers comprising a center driving shaft, a pair of axially spaced hubs mounted on said center shaft, a plurality of flexible peripheral shafts interconnecting peripheral portions of said hubs, each peripheral shaft having sufficient structural rigidity to support a moving glass sheet without appreciable distortion, means composed of a material harmless to glass mounted in glass contacting relation about the perimeter of said roll between said roll and said moving glass sheets engaged by said roll, means to fix a first one of said hubs to said center shaft in a given angular relation thereto, the second of said hubs being rotatably mounted on said center shaft in spaced relation to said fixed hub for receiving the end portions of said peripheral shafts opposite those received by said fixed hub, hub locking means positioned on said center shaft and comprising a hub locking member constructed and arranged to lock said second hub in any one of a series of discrete, preselected, readily obtained angularly disposed orientations relative to said first hub, and means to urge relative movement between said hub locking member and said second hub relative to the longitudinal axis of said center shaft to engage said second hub with said hub locking means in any selected one of said angularly disposed, discrete orientations, each of said orientations providing a discretely different configuration for the outer surface of said conveyor roll.

2. A roll as in claim 1, wherein said hub locking member is fixed in position along said centrally disposed shaft and said second hub is readily movable axially of said shaft between a position out of engagement with said hub locking member to enable said second hub to rotate to a different discrete orientation to a position engaging said hub locking member in said different orientation.

3. A roll as in claim 1, wherein said hub locking member is movable in an axial direction relative to said rotatable hub between a position out of engagement with said hub to enable said hub to rotate to a different discrete orientation and a position engaging said second hub with said second hub in said second orientation.

4. A roll as in claim 1, wherein said second hub is provided with tongue and groove means peripherally arranged in discrete orientations and said hub locking means is provided with interfitting means whereby selected groove means of said second hub receives said interfitting means of said hub locking means in any selected orientation of said discrete orientations.

5. A roll as in claim 4, wherein said tongue and groove means is constructed and arranged so that said grooves are oriented at equi-angular relation to one another.

6. A roll as in claim 1, said movement urging means including spring loading means mounted on said center shaft in position to urge relative movement of said hub locking member toward said second hub.

7. A conveyor comprising a plurality of conveyor rolls as in claim 1, wherein each of said rolls is arranged with its said second hub oriented at the same angularly disposed, discrete orientation relative to its said fixed hub as each other conveyor roll.

8. In the art of heat-treating glass sheets of different configurations on a mass production basis wherein said sheets are supported on conveyor rolls having an adjustable outer surface capable of conversion from one supporting shape to another when conveyed through a glass chilling station, each said conveyor roll having a central drive shaft, a first hub fixed to said drive shaft, a second hub free to rotate about said shaft, a hub locking member mounted in fixed angular orientation to said central drive shaft, means to urge said hub locking member and said second hub into interfitting relation with one another, and peripherally arranged shafts interconnected between said first hub and said second hub to define said supporting shapes, the improvement comprising locking said second hub in a fixed angular orientation to said first hub to provide an outer surface conforming to one configuration when conveying glass sheets of said one configuration, and upon completion of the treatment of glass sheets of said one configuration and prior to treating glass sheets of another configuration, providing relative separation between said hub locking member from interfitting relation with said second hub, rotating said second hub through a preselected discrete angle needed to provide an outer surface conforming to said another configuration while said hub locking means is separated therefrom and said first hub remains fixed to said center shaft, reengaging said hub locking means in interfitting relation with said second hub, while the latter is in the orientation conforming to said another configuration, repeating these steps for every conveyor roll having such an adjustable outer surface, and treating glass sheets of said other configuration after all said outer surfaces have been so adjusted to provide said another configuration.

9. The improvement as in claim 8, wherein said relative separation is accomplished by moving said second hub away from said hub locking member and toward said first fixed hub.

10. The improvement as in claim 8, wherein said relative separation is accomplished by moving said hub locking member away from both said first fixed hub and said second rotatable hub.

* * * * *